(12) United States Patent
Knibbe et al.

(10) Patent No.: US 10,181,193 B2
(45) Date of Patent: Jan. 15, 2019

(54) LATENCY REDUCTION IN CAMERA-PROJECTION SYSTEMS

(71) Applicant: Microsoft Corporation, Redmond, WA (US)

(72) Inventors: Jarrod Knibbe, Bristol (GB); Hrvoje Benko, Seattle, WA (US); Andrew Wilson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 14/202,719

(22) Filed: Mar. 10, 2014

(65) Prior Publication Data

US 2015/0254870 A1    Sep. 10, 2015

(51) Int. Cl.
*G06T 7/20*   (2017.01)
*G01S 11/12*  (2006.01)
(Continued)

(52) U.S. Cl.
CPC ............... *G06T 7/20* (2013.01); *G01S 11/12* (2013.01); *G06T 11/60* (2013.01); *G06T 19/006* (2013.01);
(Continued)

(58) Field of Classification Search
CPC ........................................ G06T 7/20
See application file for complete search history.

(56) References Cited

U.S. PATENT DOCUMENTS 5,114,224 A * 5/1992 Miyamoto ............ G09F 19/18
                                                353/122
6,554,431 B1 * 4/2003 Binsted ................. H04N 5/74
                                                348/E5.137
(Continued)

FOREIGN PATENT DOCUMENTS

CN    101093582 A    12/2007
CN    102737385 A    10/2012
(Continued)

OTHER PUBLICATIONS

"International Search Report & Written Opinion Received for PCT Application No. PCT/US2015/017887", dated May 29, 2015, 11 Pages.
(Continued)

*Primary Examiner* — Jeffrey A Gaffin
*Assistant Examiner* — Richard M Russell
(74) *Attorney, Agent, or Firm* — International IP Law Group, PLLC

(57) ABSTRACT

Various methods and systems for reducing the effects of latency in a camera-projection system are described herein. A method includes recording, via a camera, a plurality of frames of one or more moving objects, wherein at least one of the moving objects is a target object to have an image projected thereupon. The method can include analyzing the recorded frames of the one or more moving objects to determine a predicted path of the target object. Additionally, the method can include projecting, via a projection device, an image onto the target object using the predicted path of
(Continued)

the target object to compensate for a predetermined system latency. The method can include recording a plurality of frames of the target object and the image. The method can include adjusting the predicted path of the target object until an offset between the target object and the image is below a predetermined threshold.

18 Claims, 6 Drawing Sheets

(51) Int. Cl.
  G06T 11/60      (2006.01)
  G06T 19/00      (2011.01)
  H04N 9/31       (2006.01)
(52) U.S. Cl.
  CPC ......... *H04N 9/3185* (2013.01); *H04N 9/3194* (2013.01)

(56)         References Cited
         U.S. PATENT DOCUMENTS

| | | | |
|---|---|---|---|
| 7,345,265 B2* | 3/2008 | Page | F41G 3/2633 244/3.1 |
| 7,907,750 B2 | 3/2011 | Ariyur et al. | |
| 8,317,329 B2 | 11/2012 | Seder et al. | |
| 8,355,529 B2* | 1/2013 | Wu | A61B 5/1113 345/420 |
| 9,196,067 B1* | 11/2015 | Freed | G06T 11/60 |
| 2008/0150954 A1 | 6/2008 | Trowbridge | |
| 2008/0267450 A1* | 10/2008 | Sugimoto | A63H 17/395 382/103 |
| 2011/0199304 A1 | 8/2011 | Walley et al. | |
| 2013/0138413 A1* | 5/2013 | Finch | G06F 17/5009 703/6 |
| 2013/0286244 A1* | 10/2013 | Tirpak | H04N 5/23222 348/222.1 |
| 2013/0295539 A1 | 11/2013 | Wilson et al. | |
| 2013/0303286 A1 | 11/2013 | Ferguson et al. | |
| 2014/0015963 A1* | 1/2014 | Klaas | G01B 11/254 348/136 |

FOREIGN PATENT DOCUMENTS

| | | |
|---|---|---|
| CN | 102763422 A | 10/2012 |
| EP | 0447610 A1 | 9/1991 |
| EP | 1107052 A1 | 6/2001 |
| EP | 2540090 A2 | 1/2013 |
| WO | 2011106201 A2 | 9/2011 |

OTHER PUBLICATIONS

Allison, et al., "Tolerance of Temporal Delay in Virtual Environments", In Proceedings of the Virtual Reality Conference, Mar. 17, 2001, 8 pages.
Bandyopadhyay, et al., "Dynamic Shader Lamps: Painting on Movable Objects", In Proceedings of the IEEE and ACM International Symposium on Augmented Reality, Oct. 29, 2001,10 pages.
Barnett, Angela, "The Dancing Body as a Screen: Synchronizing Projected Motion Graphics onto the Human Form in Contemporary Dance", In Proceedings of the Computers in Entertainment (CIE)—Special Issue: Media Arts and Games, vol. 7, Issue 1, Feb. 2009, 32 pages.
Benko, et al.,"MirageTable: Freehand Interaction on a Projected Augmented Reality Tabletop", In Proceedings of the SIGCHI Conference on Human Factors in Computing Systems, May 5, 2012, 10 pages, Austin, TX, USA.
Coulson, Simon, "Real Time Position and Motion Tracking for Simulated Clay Pigeon Shooting Environments", In Project Report, Retrieved on: Nov. 27, 2013, 84 pages.
Dorfmuller-Ulhaas, Klaus, "Robust Optical User Motion Tracking Using a Kalman Filter", In Proceedings of the Technical Report of Augsburg University, May 2003, 10 pages.
Erol, et al., "Vision-Based hand posed estimation: A Review", In Journal of Computer Vision and Image Understanding, vol. 108, Issue 1-2, Oct. 2007, 22 pages.
Fairfax, et al., "Position Estimation for Projectiles Using Low-Cost Sensors and Flight Dynamics", In the Journal of Aerospace Engineering, Oct. 13, 2012, 38 pages.
Friedmann, et al., "Device Synchronization Using an Optimal Linear Filter", In Proceedings of the Symposium on Interactive 3D graphics, Mar. 29, 1992, 7 pages.
Harrison, et al., "OmniTouch: Wearable Multitouch Interaction Everywhere", In Proceedings of the 24th Annual ACM Symposium on User Interface Software and Technology, Oct. 16, 2011,10 pages, Santa Barbara, CA, USA.
Jones, et al., "IllumiRoom: Peripheral Projected Illusions for Interactive Experiences", In Proceedings of the SIGCHI Conference on Human Factors in Computing Systems, Apr. 27, 2013, 10 pages, Paris, France.
Jota, et al., "How Fast is Fast Enough? A Study of the Effects of Latency in Direct-Touch Pointing Tasks", In Proceedings of the SIGCHI Conference on Human Factors in Computing Systems, Apr. 27, 2013, 10 pages, Paris, France.
Kitani, et al., "BallCam! Dynamic View Synthesis from Spinning Cameras", In Proceedings of the Adjunct Proceedings of the 25th Annual ACM Symposium on User Interface Software and Technology, Oct. 7, 2012, 2 pages, Cambridge, MA, USA.
Liang, et al., "On Temporal-Spatial Realism in the Virtual Reality Environment", In Proceedings of the 4th Annual ACM Symposium on User Interface Software and Technology, Nov. 11, 1991, 7 pages, Hilton Head, SC, USA.
Mackenzie, et al.,"Lag as a Determinant of Human Performance in Interactive Systems", In Proceedings of in Proceedings of the INTERACT and Conference on Human Factors in Computing Systems, Apr. 24, 1993, 6 pages.
McFarlane, et al.,"Interactive Dirt: Increasing Mobile Work Performance with a Wearable Projector-Camera System", In Proceedings of in Proceedings of the 11th International Conference on Ubiquitous Computing, Sep. 30, 2009, 10 pages, Orlando, FL, USA.
Mine, Mark R., "Characterization of End-to-End Delays in Head Mounted Display Systems", In Proceedings of the Technical Report, TR93-001, Mar. 23, 1993, pp. 1-11.
Ng, et al., "Designing for Low-Latency Direct-Touch Input", In Proceedings of the 25th Annual ACM Symposium on User Interface Software and Technology, Oct. 7, 2012, pp. 453-464, Cambridge, MA, USA.
Okumura, et al., "High-Speed Gaze Controller for Millisecond Order Pan/Tilt Camera", In Proceedings of the IEEE International Conference on Robotics and Automation, May 9, 2011, 6 pages, Shanghai, China.
Okumura, et al., "Lumipen: Projection-Based Mixed Reality for Dynamic Objects", In Proceedings of IEEE International Conference on Multimedia and Expo, Jul. 9, 2012, pp. 699-704.
Papadakis, et al., "A System to Measure, Control and Minimize End-to-End Head Tracking Latency in Immersive Systems", In Proceedings of the 10th International Conference on Virtual Reality Continuum and its Applications in Industry, Dec. 11, 2011, pp. 581-584, Hong Kong, China.
Rusdorf, et al., "Real-Time Interaction with a Humanoid Avatar in an Immersive Table Tennis Simulation", In Proceedings of the IEEE Transactions on Visualization and Computer Graphics, vol. 13, Issue 1, Jan. 2007, pp. 1-11.
Schönauer, et al., "Full Body Interaction for Serious Games in Motor Rehabilitation", In Proceedings of the 2nd Augmented Human Interaction Conference, Mar. 12, 2011, 8 pages, Tokyo, Japan.
Sodhi, et al., "LightGuide: Projected Visualizations for Hand Movement Guidance", In Proceedings of the SIGCHI Conference on Human Factors in Computing Systems, May 5, 2012,10 pages, Austin, TX, USA.
Steed, Anthony, "A Simple Method for Estimating the Latency of Interactive, Real-Time Graphics Simulations", In Proceedings of

(56) References Cited

OTHER PUBLICATIONS the ACM symposium on Virtual Reality Software and Technology, Oct. 27, 2008, pp. 123-129, Bordeaux, France.

Swindells, et al., "System Lag Tests for Augmented and Virtual Environments", In Proceedings of the 13th Annual ACM Symposium on User Interface Software and Technology, Nov. 5, 2000, pp. 161-170, San Diego, CA, USA.

Teather, et al., "Effects of Tracking Technology, Latency, and Spatial Jitter on Object Movement", In Proceedings of the IEEE Symposium on 3D User Interfaces, Mar. 14, 2009, pp. 43-50, Lafayette, LA, USA.

Ware, et al., "Reaching for Objects in VR Displays: Lag and Frame Fate", In Proceedings of the ACM Transactions on Computer-Human Interaction, vol. 1, Issue 4, Dec. 1994, pp. 331-356.

Welch, et al., "An Introduction to the Kalman Filter", In Proceedings of the Technical Report, TR 95-041, Apr. 5, 2004, pp. 1-16.

Wilson, et al., "Combining Multiple Depth Cameras and Projectors for Interactions on, Above and Between Surfaces", In Proceedings of the 23nd Annual ACM Symposium on User Interface Software and Technology, Oct. 3, 2010, 10 pages.

Yapo, et al., "Dynamic Projection Environments for Immersive Visualization", In Proceedings of the IEEE Computer Society Conference on Computer Vision and Pattern Recognition Works, Jun. 13, 2010, 8 pages.

U.S. Appl. No. 14/037,986, Benko, et al., "Steerable Display System", Filed Date: Sep. 26, 2013.

"Second Written Opinion Issued in PCT Application No. PCT/US2015/017887", dated Apr. 6, 2016, 05 Pages.

"International Preliminary Report on Patentability Issued in PCT Application No. PCT/US2015/017887", dated Jul. 18, 2016, 6 Pages.

"First Office Action and Search Report Issued in Chinese Patent Application No. 201580013260.5", dated Jul. 3, 2018, 24 Pages.

* cited by examiner

600 ated by the processor, causes the processor to project, via the projection device, the image onto the target object based on the predicted path of the target object. The processor executable code, when executed by the processor, causes the processor to record, via the camera, a plurality of frames of the target object and the image. The processor executable code, when executed by the processor, causes the processor to adjust the predicted path for the target object based on an offset. The processor executable code, when executed by the processor, causes the processor to project the image onto the target object based on the adjusted predicted path.

LATENCY REDUCTION IN CAMERA-PROJECTION SYSTEMS

BACKGROUND

Camera-projection systems can overlay images onto objects as perceived by a person or allow a person to interact with a virtual reality. For example, a projection device may overlay a pattern onto an object so that the object appears to have the pattern on its surface. In some examples, these objects may be moving along a predictable or semi-predictable path. In some examples, the objects may be persons interacting with a virtual world.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a method for reducing the effects of system latency in camera-projection systems. The method includes recording, via a camera, a plurality of frames of one or more moving objects, one of which may be a target object. The recorded frames of the one or more moving objects are analyzed to determine a predicted path of the target object. An image is projected via a projection device onto the target object using the predicted path of the target object to compensate for a system latency. A plurality of frames target object and the image are recorded via the camera. The predicted path of the target object is adjusted until an offset between the target object and the image is below a predetermined threshold. The predicted path of the at least one moving object is stored in a movement store.

Another embodiment provides for one or more computer-readable storage media comprising a plurality of instructions that, when executed by a processor, cause the processor to analyze a plurality of recorded frames of one or more moving objects to determine their paths. The instructions direct the processor to create a movement store and store at least one movement of the moving objects in the movement store. The instructions direct the processor to perform a lookup in the movement store to generate a semi-predicted path for a target moving object. The instructions direct the processor to cause an interactive image to interact with a target moving object using the semi-predicted path of the target moving object. The instructions direct the processor to record a plurality of frames of the target moving object and the interactive image. The instructions direct the processor to determine an offset between the paths of the target moving object and the image and adjust the projection of the interactive image for the offset.

Another embodiment provides a system for reducing the effect of hardware latency in camera-projection systems. The system includes a processor to execute processor executable code, a camera, a projection device; and, a storage device that stores processor executable code. The processor executable code, when executed by the processor, causes the processor to analyze a plurality of recorded frames of a moving object to determine a predicted path, wherein the moving object is a target object to have an image projected thereupon. The processor executable code, when exe-

BRIEF DESCRIPTION OF THE DRAWINGS

The following detailed description may be better understood by referencing the accompanying drawings, which contain specific examples of numerous features of the disclosed subject matter.

DETAILED DESCRIPTION

Camera-projection systems are often used to project images onto the surfaces of objects or used in conjunction with virtual reality systems to track user movement and integrate the user movement within a virtual experience. In hardware based solutions, an overall latency within the hardware system introduces a lag effect wherein the system tracking the object to have an overlayed image or virtual presence has a delayed response in projecting an image or moving a virtual object in connection with a physical moving object. Embodiments described herein provide a method and system for reducing the latency present in camera-projection ("pro-cam") systems.

Figure 1:
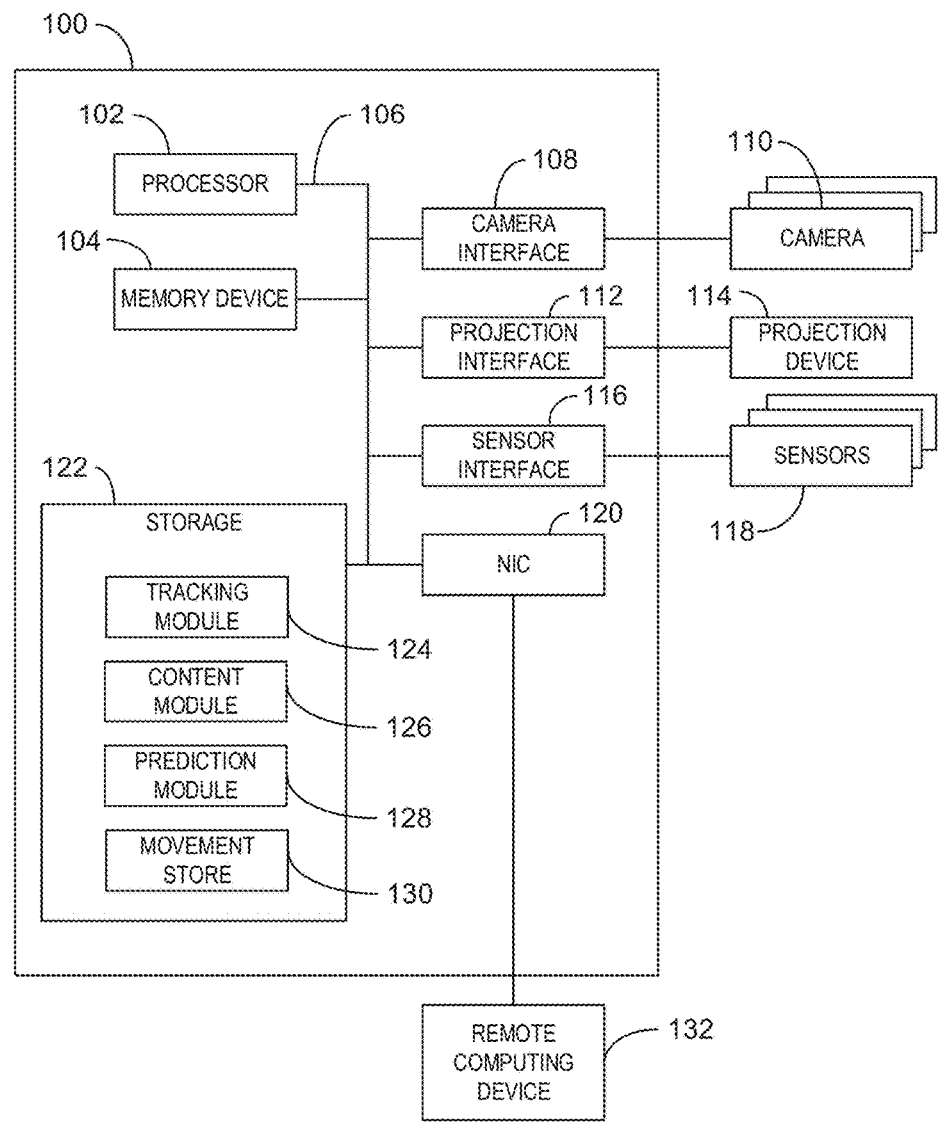
FIG. 1 is a block diagram of an example of a computing system that can reduce the effects of camera-projection latency.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

As utilized herein, terms "projection" or "projecting" are intended to include the projection of an image onto a physical surface using light as well as the collocation of an image with other images within an augmented reality device.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can reduce the effects of camera-projection latency. The computing system 100 may be, for example, a virtual reality device, a mobile phone, laptop computer, desktop computer, or tablet computer, gaming system, or camera-projection system, among others. A camera-projection system can include an augmented reality device and any suitable type of computing device that supports an augmented reality device, such as a mobile device, desktop computer, gaming system, etc. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to reduce the effects of latency caused by the various hardware components within the system.

The processor 102 may be connected through a system bus 106 (e.g., PCI®, PCI-Express®, HyperTransport®, NuBus, etc.) to a camera device interface 108 adapted to connect the computing system 100 to one or more camera devices 110. The camera device 110 may be, for example, a webcam, a gesture recognition input device, a digital single lens reflex camera, or a digital point-and-shoot camera, among others. The camera devices 110 may be built-in components of the computing system 100, or may be devices that are externally connected to the computing system 100.

The processor 102 may also be linked through the system bus 106 to a projection interface 112 adapted to connect the computing system 100 to a projection device 114. The projection device 114 may include a semi-transparent display screen or projector that is a built-in component of the computing system 100. The projection device 114 may also be a virtual reality headset, a pair of digital glasses or goggles, among other devices with semi-transparent screens that are externally connected to the computing system 100. In some examples, the projection device 114 may be a projector connected to the projection interface 112. In some examples, the projection device 114 may be part of an augmented reality device.

The processor 102 may also be linked through the system bus 106 to one or more sensors through sensor interface 116. In some examples, the sensors may be integrated into the projection device. In some examples, the sensors may be external to the projection device. In some examples, the sensors may include input devices, such as a keyboard, mouse, game pad, or the like. A network interface card (NIC) 120 may also be adapted to connect the computing system 100 through the system bus 106 to a network (not depicted). In some examples, the camera-projection system 100 may be connected to another camera-projection system 100 through the network.

The storage 122 can include a hard drive, an optical drive, a USB flash drive, an array of drives, or any combinations thereof. The storage 122 may include a tracking module 124, a content module 126, a prediction module 128, and a movement store 130. In some embodiments, the tracking module 124 may track the movements of at least one moving object. For example, the tracking module may analyze a set of recorded frames from a camera 110 and determine a location, velocity and acceleration of an object within the frames. In some examples, the tracking module 124 may track the paths of multiple objects at the same time. In some examples, the tracking module 124 may track movements of the objects. In some examples, the movements may be repeated segments of the path of an object. In some examples, these movements may include repeated interactions between objects. For example, a ball may be hit by a racket. In some examples, these movements may include repeated interactions between objects and the images. For example, an image of a ball may be hit by a racket. In some embodiments, tracking module 124 may track the movements of projection device 114. For example, tracking module 124 may track the movement of projection device 114 through a movement sensor 118 built into a projection interface 112. For example, the movement sensor input may be information from a gyroscope, accelerometer or compass, or the like, built into the projection device.

In some embodiments, the content module 126 may contain interactive images to interact with an object. In some examples, the interactive image may be an image to be projected onto the surface of a moving object using projection device 114. For example, projection device 114 may be a projector that displays an image onto a moving object. In some examples, the image may interact with an object by projecting the image onto a semi-transparent surface. For example, the semi-transparent surface may be a pair of glasses or goggles, and the like. In some examples, the semi-transparent surface may be within an augmented reality headset. In some examples, the content module 126 may adjust the appearance of the images so that the image may be accurately projected onto the surface of the target moving objects or the semi-transparent surface.

In some embodiments, the prediction module 128 may automatically calculate a system latency. For example, the prediction module 128 may cause projection device 114 to project a test image onto a moving object and camera 110 to capture a predetermined amount of frames of the test image and the moving object in order to calculate the system latency. The system latency may be calculated, for example, by projecting an image based upon a range of assumed latencies and calculating the distance error between the center of the projection and the tracked center of the moving object. For example, the latency range may be measured in milliseconds, seconds, or any other suitable measurement of time. In some examples, the prediction module 128 may calculate the system latency upon powering of the camera-projection system. In some examples, the system latency may be recalculated continuously.

In some embodiments, the prediction module 128 may calculate a predicted path for an object. This predicted path may be calculated by prediction module 128 using laws of physics. For example, projectile motion may be calculated using the acceleration of gravity and liquid motion may be calculated using laws of fluid dynamics. In some examples, the predicted path may be calculated using a Kalman filter. In some examples, the Kalman filter may be used to account for sensor noise and uncertainty in projectile movement. For example, the Kalman filter may recursively incorporate all known previous locations, velocities and accelerations of an object as recorded by tracking module 124, and predict future locations, velocities and accelerations based upon a weighted uncertainty of observation due to noise and a weighted uncertainty of prediction due to deviation of the actual path from the laws of physics.

In some embodiments, the prediction module 128 uses a movement store 130. This movement store 130 may contain, for example, the location, velocity and acceleration information of objects as recorded by tracking module 124. In some examples, the movement store 130 may be used by the prediction module 128 as a lookup table to reduce effects of latency caused by large deviations in the path of an object from a predicted path. In some embodiments, the prediction module 128 may generate semi-predicted paths for target objects based on the paths of other objects that the target objects cross paths with. For example, the prediction module 128 may determine a previously recorded location in movement store 130 that corresponds to an object's current location. In some examples, the direct location comparison might be weighted by the distances between the last positions of the object and the previous positions in the movement store 130. For example, the distances between the last three positions and the previous three positions in the movement store 130 might be calculated by the prediction module 128. If the distances are below a predefined threshold, then this location may be used as a starting value from which to proceed through the movement store 130 to arrive at a semi-predicted location. If the distances meet a predefined threshold, then the prediction module 128 may seek another location as a starting value or wait for the tracking module to add more object movements to the movement store 130.

In some embodiments, the prediction module 128 may use a Kalman filter to determine the semi-predicted path of an object. In some examples, the Kalman filter may be weighted for any degree of uncertainty in projectile movement. For example, the Kalman filter may be assigned a high uncertainty in acceleration based on observed deviations in acceleration.

In some embodiments, the movement store 130 is created by the tracking module 124 upon powering on the system. In some embodiments, the movement store 130 may be stored before powering the system off in order to allow for a larger history of object movements for improved performance.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional I/O Devices, etc.). Furthermore, any of the functionalities of the tracking module 124, content module 126, or prediction module 128, may be partially, or entirely, implemented in hardware and/or in the processor 102. For example, the functionality may be implemented with an application specific integrated circuit, in logic implemented in the processor 102, or in any other device.

Figure 2:
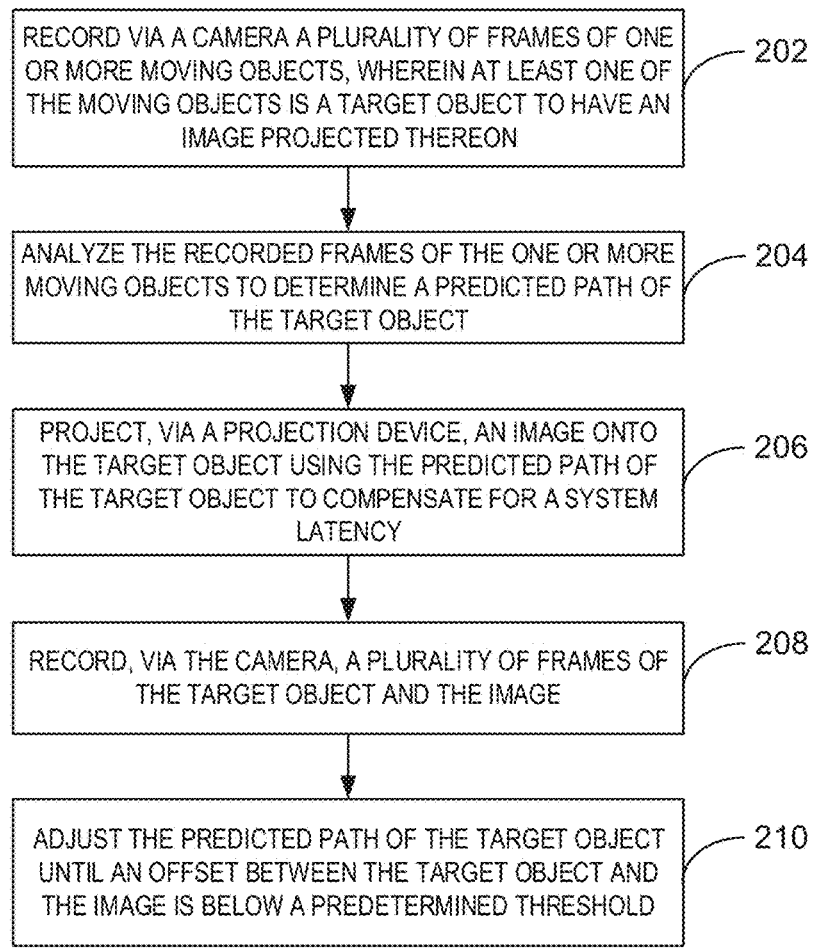
FIG. 2 is a process flow diagram of an example method for reducing camera-projection system latency effects for objects with predictable paths.

FIG. 2 is a process flow diagram of an example method for reducing camera-projection system latency effects for objects with predictable paths. The method 200 can be implemented with any suitable computing device, such as the computing device 100 of FIG. 1.

At block 202, the camera 110 can record a plurality of frames of one or more moving objects, wherein at least one of the moving objects is a target object to have an image projected thereupon. The moving objects may include any physical object onto which an image can be projected that is moving according to a predictable path. In some examples, the objects may be moving in a motion according to the laws of gravity or fluid dynamics. For example, the objects may be balls, or any other suitable objects, that have been propelled into the air. In some examples, the objects may be moving according to some other laws of physics. In some examples, the objects may be following the kinematics of the human body.

At block 204, the tracking module 124 can analyze the recorded frames of the one or more moving objects to determine a predicted path of the target object. In some examples, the predicted paths may be determined by comparing the location of the moving objects within two or more frames. For example, the center of one object may be compared to the center of the same object in another frame to determine the object's location and velocity. In some examples, the tracking module 124 may determine a relative position that may be a position relative to the camera and initial velocity of each object from the recorded frames. In some embodiments, a Kalman filter may be used to provide more accurate results. The Kalman filter may recursively update the predicted path with observed locations for increased accuracy of the predicted path. In some examples, the values for process and observation noise of the Kalman filter may be altered based on observation of the objects. In some examples, the Kalman filter's prediction value may be given a comparatively low value due to the observed predictability of an object's path. For example, the Kalman filter may be given a relatively low value for uncertainty in the $x^*_t$ (prediction) values in the following example update equations for position, $x_t$, velocity $v_t$, and acceleration $a_t$ at time t, observation $z_t$ of the target object's position, prediction $x^*_t$ of the value of $x_t$ given $x_{t-1}$, and Kalman gains $k_x$, $k_v$, $k_a$, where "*" denotes an element-wise operation while the other operations are vector operations:

$$x_t = x_{t-1} + k_x * (z_t - x_t^*) \quad (1)$$

$$v_t = v_{t-1} + k_v * (z_t - x_t^*) \quad (2)$$

$$a_t = a_{t-1} + k_a * (z_t - x_t^*) \quad (3)$$

In some examples, the Kalman filter may be fitted with a predesigned model for a particular type of motion. For example, the Kalman filter may be fitted with a projectile motion model based on initial launch velocities and angles of release. In some examples, the movement model may be changed or combined with other models based upon observed movements according to some law of physics.

At block 206, the content module 126 may cause the projection device 114 to project an image onto the target object using the predicted path of the target object to compensate for a predetermined system latency. In some examples, the predetermined system latency may be determined after the device is turned on but before the image is displayed. For example, the content module 126 may cause a test image to be displayed onto a moving object and record a few frames to analyze the offset of a variety of latency settings until a local minimum is reached. The system may then set the local minimum latency setting as the predetermined system latency setting.

At block 208, the camera 110 may record a plurality of frames of the target object and the image. In some examples, the plurality of frames may be stored in movement store 130.

At block 210, the prediction module 128 may adjust the predicted path of the target object until an offset between the target object and the image is below a predetermined threshold. In some examples, the offset is an effect of latency in a projection system, which results in an image being projected at a different location than the target moving object. In some examples, this offset may be calculated by first determining a center of the target object and a center of the image. In some examples, this offset is input into a Kalman filter for further processing before determining whether the offset meets the predetermined threshold. For example, the Kalman filter may work in conjunction with a model based on physics if the object displays a predictable path.

In some examples, the prediction module 128 may determine whether a predicted path of the target object is predictable based on the plurality of recorded frames of block 208. In some examples, the prediction module 128 may determine that a predicted path is reliable based on the feedback gained from prior recorded frames. The prediction module 128 may then adjust the uncertainty in the Kalman filter accordingly. For example, if prediction uncertainty is low, then the prediction uncertainty variable $x^*_t$ of Equations (1), (2), and (3) may be adjusted accordingly. If the observation noise is high, then the observation uncertainty variable $z_t$ of Equations (1), (2) and (3) may be adjusted accordingly. For example, observation uncertainty may be high if the light levels fluctuate and effect the tracking modules ability to analyze the moving objects. The corresponding uncertainty variable $z_t$ would be adjusted for this fluctuation.

In some examples, the prediction module 128 may apply a Kalman filter to the predicted path of the target object. The content module 126 may then begin projecting the image onto the target object based upon the predicted path created by the adjusted Kalman filter.

The process flow diagram of FIG. 2 is not intended to indicate that the steps of the method 200 are to be executed in any particular order, or that all of the steps of the method 200 are to be included in every case. Further, any number of additional steps may be included within the method 200, depending on the specific application. For example, the prediction module 128 and tracking module 124 may also generate an automatically tuned system latency to be used by content module 126 in initially projecting an image. For example, the projection device 114 may display a test image onto a moving object at a variety of latency adjustments and camera 110 may capture and send frames to tracking module 124. The tracking module may then determine a local minimum in which the latency effect is minimized by a specific latency adjustment. This specific latency adjustment may then be used as a base latency adjustment for the system to use.

Figure 3:
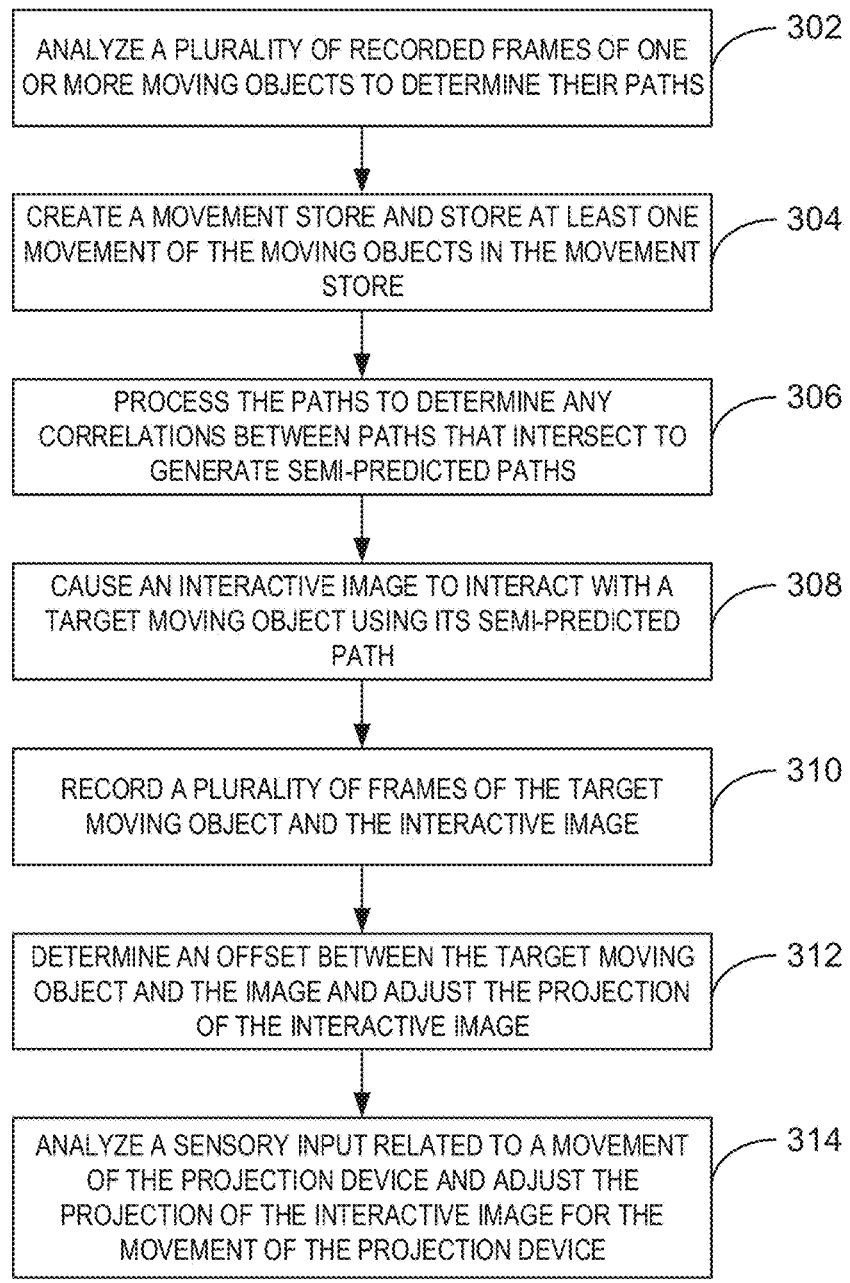
FIG. 3 is a process flow diagram of an example method for reducing camera-projection system latency effects for objects with semi-predictable paths.

FIG. 3 is a process flow diagram of an example method for reducing camera-projection system latency effects for objects with semi-predictable paths. The method 300 can be implemented with any suitable computing device, such as the computing device 100 of FIG. 1 or using the example computer-readable storage media 500 of FIG. 5.

At block 302, the tracking module 124 may analyze a plurality of recorded frames of one or more moving objects to determine their paths. In some examples, analyzing the frames may involve the use of a physics model. In some examples, this may involve the use of a Kalman filter as discussed in block 204 of method 200. In some examples, a kinematic motion model may be used with the Kalman filter. For example, the kinematic motion model may take advantage of factors such as human joint rotation limits to improve object path prediction.

At block 304, the tracking module 124 may create a movement store 130 and store specific movements of the moving objects in the movement store 130. In some examples, the movements may be portions of object paths that are repeated. In some examples, the paths of the moving objects may recorded for a predetermined period of time, wherein the predetermined period of time can be any suitable number of seconds or frames per second. For example, with a juggling movement that is performed at a high frequency, the amount of time for a given movement may only be three seconds, or 90 frames at 30 frames/second. In some examples, object paths may be recorded until a certain number of movements are determined. In some examples, the object paths may be recorded continuously to maximize the available movements in the movement store.

At block 306, the prediction module 128 may process the paths to determine any correlations between paths that intersect to generate semi-predicted paths. In some examples, a model may be created based upon the motions of a particular person and stored for later use. For example, the object may be a person swinging a bat. The person's particular swinging movement may be stored and used later to reduce effects of latency more accurately when the same person swings again. In some examples, a model may be created for the movements of a particular object and the other objects it may interact with. For example, a model for a ball may have movements recorded and stored for interactions with a bat, a tennis racket, a hand, or the like.

At block 308, content module 126 may cause an interactive image to interact with a target moving object using its semi-predicted path. In some examples, the interactive image may be a projected image onto a surface. For example, a projector may project a smiley face onto a ball in motion. In some examples, the interactive image may be a projection on a semi-transparent surface. For example, the interactive image may be shown within an augmented reality device that may display the interactive image onto a semi-transparent screen that allows the target moving object to interact with the image seen in front of it. In some examples, the content module 126 may use an object models to create semi-predictable paths. For example, a ball's semi-predicable path may be based on a model that includes past swings of a racket attempting to hit the ball. The past swings in the model may be used to create a semi-predictable path for the ball when a racket is swung in the direction of its path.

At block 310, the camera 110 may record a plurality of frames of the target moving object and the interactive image. In some examples the camera may be one or more external cameras connected to a camera interface. In some examples, the one or more cameras may be internally adapted to the projection device. For example, a virtual reality device may have a camera mechanism that allows the system to analyze the interaction of images that the user may be perceiving.

At block 312, the prediction module 128 may determine an offset between the target moving object and the image and adjust the projection of the interactive image. In some examples, the offset may be measure between a determined center of the target moving object and a center of the interactive image. In some examples, the offset may be processed in a Kalman filter.

At block 314, the prediction module 128 may analyze a sensory input related to a movement of the projection device and adjust the projection of the interactive image for the movement of the projection device. In some examples, the tracking module 124 may receive the sensory input and from a sensor 118 and send this information to the prediction module 128. The prediction module 128 may then recalculate the semi-predicted path based on this movement information. The content module 126 may then adjust the interactive image to be displayed on the projection device 114.

Figure 4:
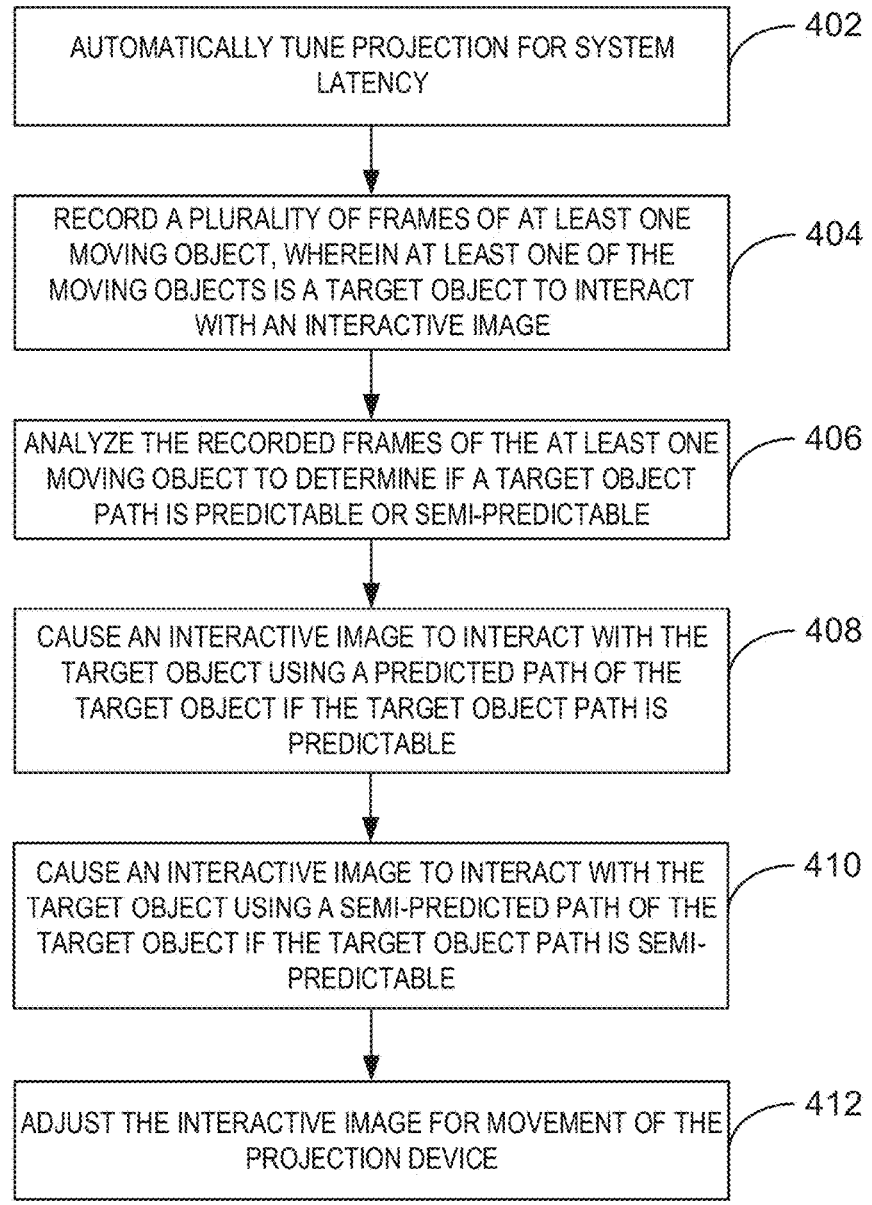
FIG. 4 is a process flow diagram of an example method for reducing camera-projection system latency effects for objects having both predictable and semi-predictable paths.

FIG. 4 is a process flow diagram of an example method for reducing camera-projection system latency effects for objects having both predictable and semi-predictable paths. The method 400 can be implemented with any suitable computing device, such as the computing device 100 of FIG. 1.

At block 402, the tracking module 124 and prediction module 128 may automatically tune projection for system latency. In some examples, the tuning may be done by projecting test images using different latency correction settings onto a moving object and finding a local minimum as in block 206 above. In some examples, the system latency may be the total latency of the system, including any externally attached sensors 118, projection devices 114, and cameras 110.

At block 404, the camera may record a plurality of frames of at least one moving object, wherein at least one of the moving objects is a target object to interact with an interactive image. In some examples, the moving object may be a racket, or any other object having a predictable or semi-predictable movement. For example, the target moving object may be a racket that may interact with the interactive image of a ball.

At block 406, the prediction module 128 may analyze the recorded frames of the at least one moving object to determine if a target object path is predictable or semi-predictable. As in the above examples of 200 and 300, the moving objects may be either moving in predictable paths or semi-predictable paths. For example, an object moving in a predictable path may be moving along a path according to some law of physics. An object moving in a semi-predictable path may be a racket that is being swung by a human arm.

At block 408, the content module 126 may cause an interactive image to interact with the target object using a predicted path of the target object if the target object path is predictable. In some examples, the prediction module may determine which, if any, predicted path to use for a target object. For example, if the target object is moving along a predictable path according to some law of physics, then the prediction module may choose to use a predicted path for the object based upon an appropriate model of physics.

At block 410, the content module 126 may cause an interactive image to interact with the target object using a semi-predicted path of the target object if the target object path is semi-predictable. In some examples, the prediction module may determine that the path of the target object intersects with the path of another object at regular intervals or locations. In some examples, the target object may intersect paths with an interactive image. For example, an interactive image of a ball may be hit by a racket by a gamer at the same position. The prediction module may use a past swing of the racket as a model for determining the path of the interactive image of a ball after the racket is swung once again.

At block 412, the prediction module 128 may adjust the interactive image for movement of the projection device. In some examples, the interactive image may be displayed in an augmented reality device. The sensors 118 within the device may send information to the tracking module 124 through the sensor interface 116. For example, if a person turns their head while wearing an augmented reality device, the sensors such as a compass or gyroscope may sense the movement and send this information to the tracking module 124. The prediction module 128 may then send this information to the content module 126 to correct the interactive image by the sensed amount of movement.

Figure 5:
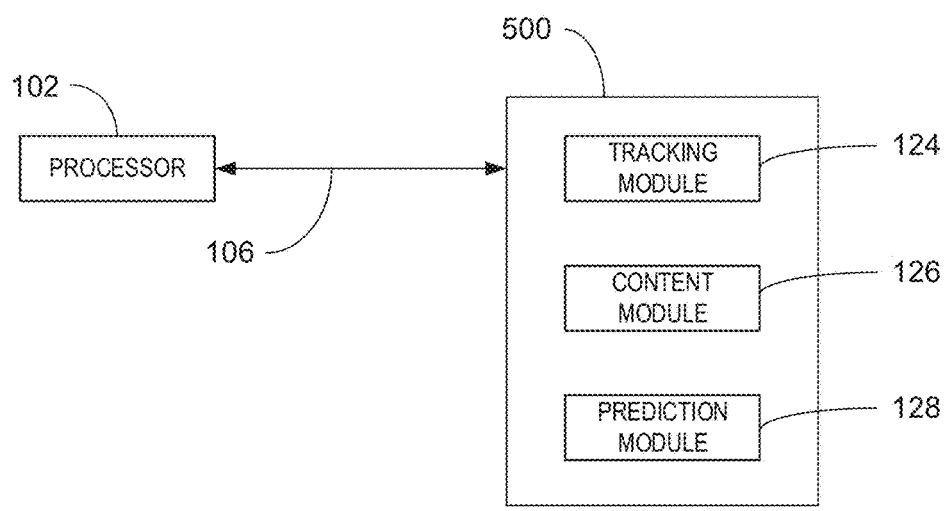
FIG. 5 is a block diagram showing an example computer-readable storage media that may be used to reduce the effects of latency in projection systems; and, FIG. 6 is a set of four drawings showing an example of camera-projection system latency reduction of varying levels.

FIG. 5 is a block diagram showing an example computer-readable storage media that may be used to reduce the effects of latency in projection systems. The computer-readable storage media 500 may be accessed by a processor 102 over a computer bus 106. Furthermore, the computer-readable storage media 500 may include code to direct the processor 102 to perform the steps of the current methods. In particular, computer-readable storage media 500 may include a tracking module 124, a content module 126, and a prediction module 128. In some examples, the tracking module 124 may track the paths and movements of objects and store the movements in the movement store 130. In some examples, the content module 126 may contain interactive images to be overlayed on an object or projected onto a semi-transparent surface. In some examples, the content module may adjust the interactive images to properly overlay the image on the object. In some examples, the prediction module 128 may calculate a system latency. In some examples, the prediction module 128 may calculate the system latency. In some examples, the prediction module 128 may create a predictable or semi-predictable path for an object based on the system latency. In some examples, the prediction model 128 may use a Kalman filter and a physics model to create a predictable or semi-predictable path for an object.

It is to be understood that any number of additional software components not shown in FIG. 5 may be included within the computer-readable storage media 500, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Figure 6:
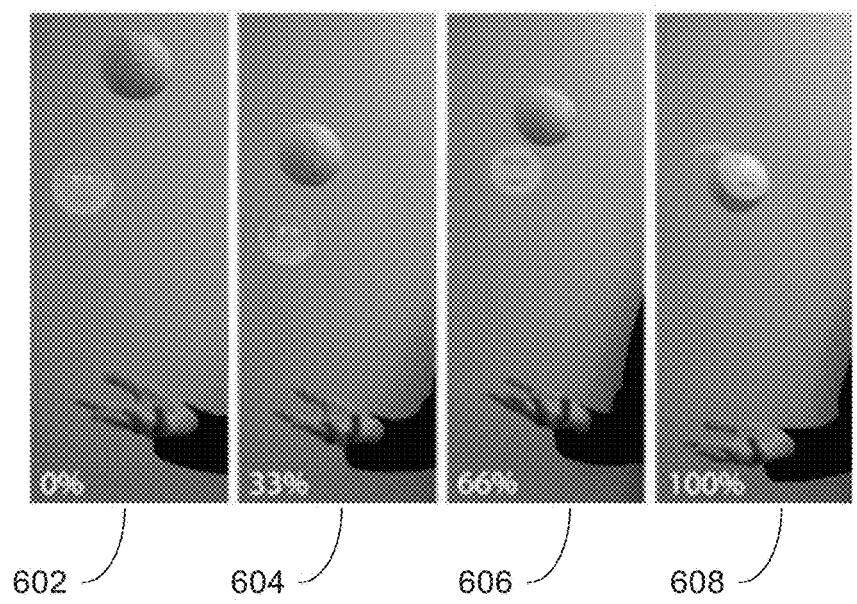

FIG. 6 is a set of four drawings showing an example of camera-projection system latency reduction of varying levels. In the example of FIG. 6, a target ball is being propelled into the air by a hand. In drawing 602, the system latency is present and the image lags behind the ball by about the diameter of the ball. In some examples, tracking module 124 may be analyzing frames recorded by camera 110. In drawing 604, the latency reduction system 100 is reducing the latency of projecting the image on the ball by approximately 33%. In drawing 604, the image is now within a diameter distance of the ball. In some examples, the prediction module 128 may have determined a predicted path for the ball based on a physics model of the acceleration due to gravity. The content module 126 may partially adjust the image based on the predicted path and the 33% latency reduction setting. In drawing 606, the system 100 is reducing the latency by approximately 66%. In some examples, the content module 126 may now adjust the image based upon the same predicted path and the 66% latency reduction setting. For example, the image is now almost displayed onto the ball, however, the image is still projected onto a wall behind the ball. In drawing 608, the system 100 is reducing the latency by approximately 100%. In some examples, the content module 126 may adjust the image based upon the same predicted path and the 100% latency reductions setting. In the example, the image is now on the ball, with a slight portion of the image still projected onto the wall behind the ball.

The invention claimed is:

1. A method for reducing the effects of system latency in camera-projection systems comprising:
recording, via a camera, a plurality of frames of one or more moving objects, wherein at least one of the moving objects is a target moving object to have an image projected thereupon;
analyzing the recorded frames of the one or more moving objects to determine a predicted path of the target moving object;
projecting, via a projection device, an image onto the target moving object based on the predicted path of the target moving object, wherein the predicted path is predicted based at least in part on a movement of a limb interacting with the target moving object using a kinematic motion model, the target moving object being separate from the limb;
recording, via the camera, a plurality of frames of the image projected onto the target moving object; and,
iteratively adjusting the predicted path of the target moving object until a detected offset between a center of the target moving object and a center of the projected image in a recorded frame of the projected image on the target moving object is below a predetermined threshold.

2. The method of claim 1, wherein adjusting the predicted path of the target moving object includes using a Kalman filter.

3. The method of claim 1, further comprising analyzing the recorded frames of the one or more moving objects to determine the predicted path of the target moving object using a physics model.

4. The method of claim 3, wherein analyzing the recorded frames of the moving objects comprises calculating a relative position and a velocity of the moving objects from the plurality of frames.

5. The method of claim 3, wherein analyzing the recorded frames of the moving objects comprises detecting movements for each moving object.

6. The method of claim 1, wherein a system latency may be determined by automatically tuning the system.

7. One or more computer-readable storage media comprising a plurality of instructions that, when executed by a processor, cause the processor to:
analyze a plurality of recorded frames of one or more moving objects to determine a predicted path for each of the one or moving objects based on detected movement of each of the one or more moving objects;
project an image onto a target moving object of the moving objects based on the predicted path of the target moving object predicted based on a movement of a limb interacting with the target moving object using a kinematic motion model, and record a plurality of frames of the image projected onto the target moving object, the target moving object being separate from the limb;
determine an offset between a center of the target moving object and a center of the image in a recorded frame of the image projected onto the target moving object;
iteratively adjust the predicted path for the target moving object to reduce the offset in a next recorded frame until the offset is below a threshold; and,
project the image onto the target moving object based on the adjusted predicted path.

8. The one or more computer-readable storage media of claim 7, wherein the processor may adjust a projection of the interactive image using a Kalman filter.

9. The one or more computer-readable storage media of claim 8, wherein the Kalman filter is used with the kinematic motion model.

10. The one or more computer-readable storage media of claim 7, wherein the interactive image is displayed within an augmented reality device.

11. The one or more computer-readable storage media of claim 7, wherein the instructions further cause the processor to analyze a sensory input related to a movement of a projection device and adjust a projection of the interactive image for the movement of the projection device.

12. A system, comprising:
a processor to execute processor executable code;
a camera;

a projection device; and, a storage device that stores processor executable code, wherein the processor executable code, when executed by the processor, causes the processor to:

analyze a plurality of recorded frames of a target moving object to determine a predicted path of the target moving object based at least in part on a movement of a limb interacting with the target moving object using a kinematic motion model, wherein the target moving object is a target object to have an image projected thereupon and separate from the limb;

project, via the projection device, the image onto the target moving object based on the predicted path of the target moving object;

record, via the camera, a plurality of frames of the image projected onto the target moving object;

iteratively adjust the predicted path for the target moving object to reduce an offset determined between a center of the target moving object and a center of the image in a frame of the image projected onto the target moving object until the offset is below a predetermined threshold; and project the image onto the target moving object based on the adjusted predicted path.

13. The system of claim 12, wherein adjusting the predicted path for the target moving object based on an offset includes inputting the offset into a Kalman filter.

14. The system of claim 12, wherein analyzing the recorded frames of the plurality of moving objects includes creating a table.

15. The system of claim 12, wherein the processor executable code, when executed by the processor, causes the processor to calculate a relative position and a velocity of the moving objects from the plurality of recorded frames.

16. The system of claim 12, wherein the processor executable code, when executed by the processor, causes the processor to detect movements for each moving object.

17. The system of claim 12, wherein the processor executable code, when executed by the processor, causes the processor to adjust an uncertainty in a Kalman filter based on feedback gained from the plurality of recorded frames.

18. The system of claim 12, wherein the kinematic motion model comprises human joint rotation limits.

* * * * *